United States Patent
Anderson et al.

(10) Patent No.: US 9,681,598 B2
(45) Date of Patent: Jun. 20, 2017

(54) BELLCRANK ACTIVATED WHEEL CASTER

(71) Applicant: CNH Industrial America LLC, New Holland, PA (US)

(72) Inventors: Brian J. Anderson, Yorkville, IL (US); William L. Schroeder, Downers Grove, IL (US); Marvin A. Prickel, Homer Glen, IL (US)

(73) Assignee: CNH Industrial America LLC, New Holland, PA (US)

( * ) Notice: Subject to any disclaimer, the term of this patent is extended or adjusted under 35 U.S.C. 154(b) by 65 days.

(21) Appl. No.: 14/755,816

(22) Filed: Jun. 30, 2015

(65) Prior Publication Data

US 2017/0000007 A1 Jan. 5, 2017

(51) Int. Cl.
*A01B 63/22* (2006.01)
*A01C 7/08* (2006.01)
*A01B 73/06* (2006.01)

(52) U.S. Cl.
CPC ............ *A01B 63/22* (2013.01); *A01B 73/065* (2013.01); *A01C 7/08* (2013.01)

(58) Field of Classification Search
CPC ....... A01B 73/02; A01B 63/002; A01B 63/11; A01B 63/16; A01B 63/118; A01B 63/22; A01B 73/065; A01C 7/08
See application file for complete search history.

(56) References Cited

U.S. PATENT DOCUMENTS

| | | | |
|---|---|---|---|
| 2,199,392 A | 5/1940 | Dabrasky | |
| 2,410,918 A * | 11/1946 | Acton | A01B 63/22 172/316 |
| 2,464,615 A | 3/1949 | Sawall | |
| 2,532,577 A * | 12/1950 | Silver | A01B 63/22 172/413 |
| 2,615,430 A * | 10/1952 | Fletcher | A01B 63/22 137/599.16 |
| 2,669,920 A * | 2/1954 | Da Valle | A01C 11/006 111/109 |
| 2,938,588 A * | 5/1960 | Stein | A01B 23/046 172/240 |
| 3,057,088 A | 10/1962 | George et al. | |
| 3,185,330 A | 5/1965 | Buckner | |
| 3,481,408 A * | 12/1969 | Twidale | A01B 35/30 172/311 |
| 3,627,053 A | 12/1971 | Hook et al. | |
| 3,642,073 A | 2/1972 | Geurts | |
| 3,700,041 A | 10/1972 | Ryan | |

(Continued)

*Primary Examiner* — Jamie L McGowan
(74) *Attorney, Agent, or Firm* — Rebecca L. Henkel; Rickard K. DeMille

(57) ABSTRACT

An agricultural planter has at least one wing section that can rotate forward to a transport configuration and can also rotate outward to a working configuration. The at least one wing section has a caster assembly attached to a strut pivotable between a raised position forward of the at least one wing section and a lowered position beneath the at least one wing section. At least one wing section lift cylinder is located above and horizontally rearward of the at least one wing section, and is connected to the at least one wing section using a rearward extending wing section lift cylinder mounting bracket. The at least one wing section lift cylinder is connected to at least one bell crank, which is connected to at least one drop link, which is connected to the strut.

17 Claims, 2 Drawing Sheets

(56) References Cited

U.S. PATENT DOCUMENTS

| | | | | |
|---|---|---|---|---|
| 3,812,919 A * | 5/1974 | Baughman | ............ | A01B 63/22 172/328 |
| 3,856,319 A | 12/1974 | Hardy | | |
| 3,866,935 A | 2/1975 | Nelson | | |
| 4,043,403 A * | 8/1977 | Anderson | ............ | A01B 63/22 172/413 |
| 4,150,725 A * | 4/1979 | Crumrine | ............ | A01B 23/046 172/311 |
| 4,286,672 A | 9/1981 | Forsyth et al. | | |
| 4,317,489 A * | 3/1982 | Steinbach | ............ | A01B 63/22 172/400 |
| 4,326,594 A | 4/1982 | Oka et al. | | |
| 4,354,688 A | 10/1982 | Swanson | | |
| 4,359,105 A * | 11/1982 | Van Natta | ............ | A01B 73/00 172/386 |
| 4,364,581 A * | 12/1982 | Shoup | ............ | A01B 73/065 172/311 |
| 4,428,435 A * | 1/1984 | Hubbard | ............ | A01B 63/22 172/328 |
| 4,606,413 A * | 8/1986 | Hake | ............ | A01B 63/22 172/328 |
| 4,944,355 A * | 7/1990 | Karchewski | ........ | A01M 7/0082 172/278 |
| 4,971,154 A | 11/1990 | McKemie | | |
| 5,086,847 A * | 2/1992 | Meiners | ............ | A01B 63/22 172/240 |
| 5,957,218 A * | 9/1999 | Noonan | ............ | A01B 63/10 172/239 |
| 5,988,293 A * | 11/1999 | Brueggen | ............ | A01B 63/22 172/413 |
| 6,035,943 A * | 3/2000 | Gerein | ............ | A01B 63/22 172/328 |
| 6,679,339 B1 * | 1/2004 | Steinlage | ............ | A01B 63/22 172/395 |
| 6,786,130 B2 * | 9/2004 | Steinlage | ............ | A01B 63/22 172/318 |
| 6,860,335 B2 * | 3/2005 | Arnett | ............ | A01B 73/065 111/57 |
| 7,063,167 B1 | 6/2006 | Staszak et al. | | |
| 7,921,932 B2 * | 4/2011 | Poole | ............ | A01C 7/208 172/311 |
| 8,342,256 B2 * | 1/2013 | Adams | ............ | A01B 73/02 172/311 |
| 9,010,451 B2 * | 4/2015 | Dames | ............ | A01B 73/065 172/311 |
| 2005/0241840 A1 * | 11/2005 | Steinlage | ............ | A01B 63/22 172/452 |
| 2011/0311338 A1 | 12/2011 | Patrick et al. | | |

* cited by examiner

BELLCRANK ACTIVATED WHEEL CASTER

BACKGROUND OF THE INVENTION

1. Field of the Invention

The present invention relates to agricultural planters, and, more particularly, to agricultural planters having wings with caster wheels that can be raised when in a working configuration and that can be lowered when in a transport configuration.

2. Description of the Related Art

Agricultural planters are commonly used implements to plant seeds in soil. An agricultural planter can include a chassis that carries one or more storage tanks full of seeds or other particulate that is to be spread on a field for planting, a hitch mechanism that attaches to a tractor or other implement pulled by a tractor, and a tool bar to which row units can be connected so that they are carried by the chassis.

Each row unit of the agricultural planter places seeds in the field. Typically, the row units are laterally arranged along a length of the tool bar so that as the planter is pulled across the field, each row unit plants seeds at predefined intervals along the path it is pulled across. To plant seeds, the row units perform four main operations as they are pulled: opening a trench in the soil; placing a seed into the formed trench at appropriate intervals; closing the formed trench to put soil on top of the placed seed; and packing soil on top of the seed to provide desirable soil contact with the placed seed.

To open a trench in the soil, a furrowing disc, also called an opening disc, presses into the soil and rotates, dislocating soil as it rotates to form the trench. Seeds are then placed in the trench at predefined intervals by a metering device which receives seeds from the main storage tank(s) or a row unit storage tank. One or more closing discs carried behind the furrowing disc are pressed into the soil and also rotate as the planter is pulled to cover the seeds placed in the trench with soil. Finally, a pressing wheel carried behind the closing disc(s) exerts pressure on the soil covering the seed to press the soil down onto the seed and provide good soil contact with the seeds. By having multiple row units working in unison as the planter is pulled across a field, many seeds can be effectively planted in an efficient manner.

Agricultural planters, like other agricultural implements, are often very wide, in order to efficiently perform their function over a large area in a given pass by the implement. In order to accomplish this, and yet to be transportable by road, they are often built to be folded into a transport configuration and unfolded into a working configuration. In order to fold into the transport configuration, often a set of wing sections rotate forward about vertical hinges until they are parallel with a main hitch bar of a center section of the agricultural planter. The center section is generally provided with a set of main wheels that can be raised when in the working configuration and lowered when in the transport configuration, and the wing sections are generally provided with wing section wheels that can be similarly raised and lowered.

In order to raise and lower the wing section wheels, hydraulic cylinders are used, typically located to the rear of the wing sections. However, locating the hydraulic cylinders to the rear of the wing sections uses valuable space needed for row units, and limits the placement and spacing of the row units. Further, locating the hydraulic cylinders to the rear of the wing sections limits the size and stroke of the hydraulic cylinders, so that less than optimal force and pressure must be used. The hydraulic cylinders may alternately be located to the front of the wing sections. However, this location interferes with folding the wing sections forward and close to the hitch bar of the center section of the agricultural planter.

What is needed in the art is a way to transition the wing section wheels from the working configuration to the transport configuration, without having hydraulic cylinders occupying space needed for row units to the rear of the wing sections, and without having the same hydraulic cylinders occupying space to the front of the wing sections which interferes with folding the wing sections forward and close to the hitch bar of the center section of the agricultural planter.

What is further needed in the art is a way for the wing section wheels to provide vertical support to the agricultural planter while in the transport configuration, while in the working configuration, and during the transition back and forth between the transport configuration and the working configuration.

SUMMARY OF THE INVENTION

The present invention provides such a way to raise and lower the wing section wheels without placing the hydraulic cylinders to the rear or forward of the wing section. The present invention further leaves the space to the rear of the wing section completely clear for the free placement and spacing of row units. The present invention also minimizes the space used forward of the wing section when the wing section wheels are lowered into the transport configuration.

The invention in one form is directed to an agricultural planter having at least one wing section that can rotate forward about a vertical hinge to a transport configuration and can also rotate outward about the vertical hinge to a working configuration. The at least one wing section has a caster assembly attached to a strut, the strut being pivotable between a raised position forward of the at least one wing section and a lowered position beneath the at least one wing section. The strut rotates about a strut pivot point attached to the at least one wing section. At least one wing section lift cylinder is located above and horizontally rearward of the at least one wing section, and is connected to the at least one wing section using a rearward extending wing section lift cylinder mounting bracket. The at least one wing section lift cylinder is connected to at least one bell crank, which is connected to at least one drop link, which is connected to the strut.

The invention in another form is directed to a support arrangement for a wing section of an agricultural planter, the wing section being operable to rotate forward about a vertical hinge to a transport configuration and to rotate outward about said vertical hinge to a working configuration. A caster assembly is attached to a strut, the strut being pivotable between a raised position forward of the at least one wing section and a lowered position beneath the at least one wing section. The strut rotates about a strut pivot point attached to the at least one wing section. At least one wing section lift cylinder is located above and horizontally rearward of the at least one wing section, and is connected to the at least one wing section using a rearward extending wing section lift cylinder mounting bracket. The at least one wing section lift cylinder is connected to at least one bell crank, which is connected to at least one drop link, which is connected to the strut.

The invention in another form is directed to a method of providing an agricultural planter reconfigurable between a working configuration and a transport configuration. The method involves providing at least one wing section operable to rotate forward about a vertical hinge to the transport configuration and to rotate outward about the vertical hinge to the working configuration. The method further involves providing a caster assembly attached to a strut, the strut being pivotable between a raised position forward of the at least one wing section and a lowered position beneath the at least one wing section. The strut rotates about a strut pivot point attached to the at least one wing section. The method further involves providing at least one wing section lift cylinder located above and horizontally rearward of the at least one wing section, and being connected to the at least one wing section using a rearward extending wing section lift cylinder mounting bracket. Finally, the method involves providing at least one bell crank, the at least one wing section lift cylinder being connected to the at least one bell crank, which is connected to at least one drop link, which is connected to the strut.

An advantage of the present invention is that it leaves the space to the rearward of the wing section clear so that the row units can be placed conveniently along its length. The present invention further provide minimal intrusion on the space forward of the wing section when the caster assembly is in the lowered position, so that the wing section can fold closely to the hitch bar of the center section.

A further advantage of the present invention is that the caster assemblies provide stable, fixed support to the wing sections when in the working configuration, while providing swiveling support to the wing sections when in the transport configuration and while transitioning from the working configuration to the transport configuration.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates embodiment of the invention, in one form, and such exemplification is not to be construed as limiting the scope of the invention in any manner.

DETAILED DESCRIPTION OF THE INVENTION

Figure 1:
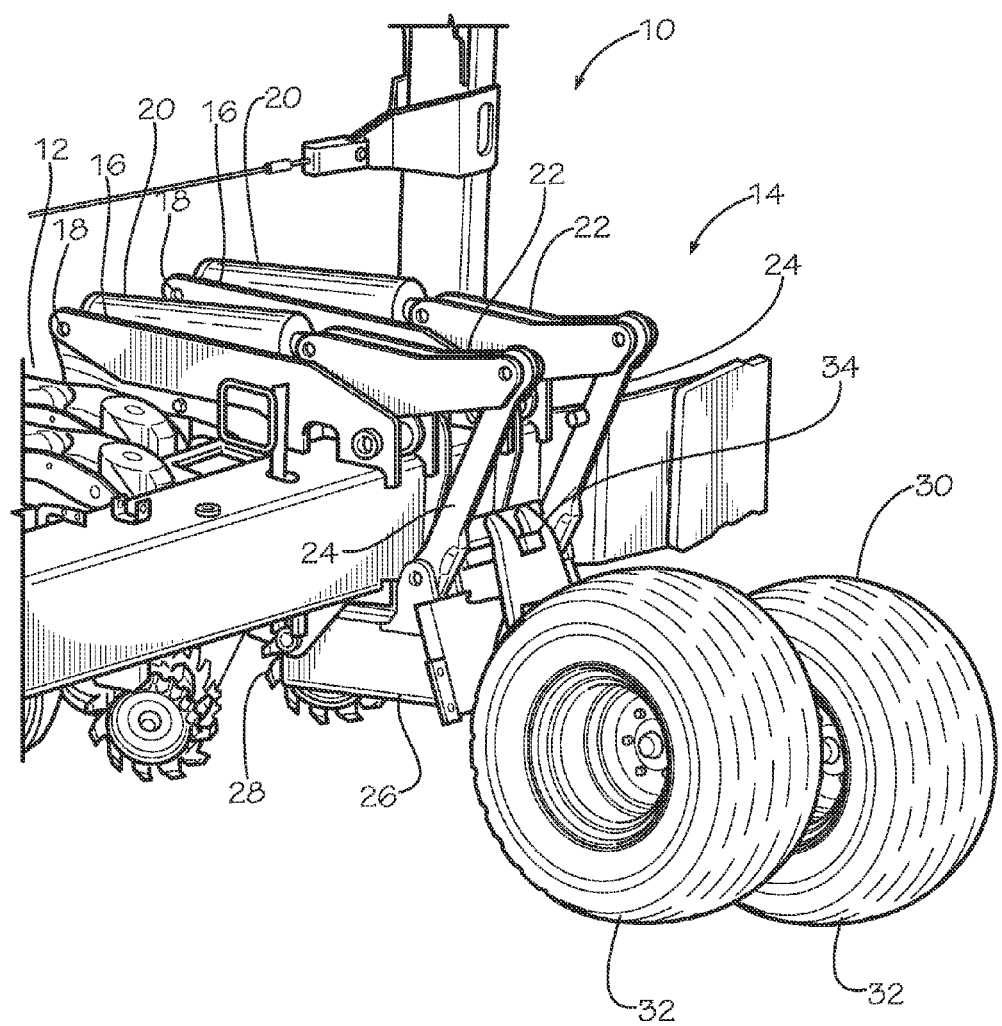
FIG. 1 is an isometric partial front view of a wing section of an agricultural planter having a caster assembly that can be raised and lowered, in the raised working configuration.
Figure 2:
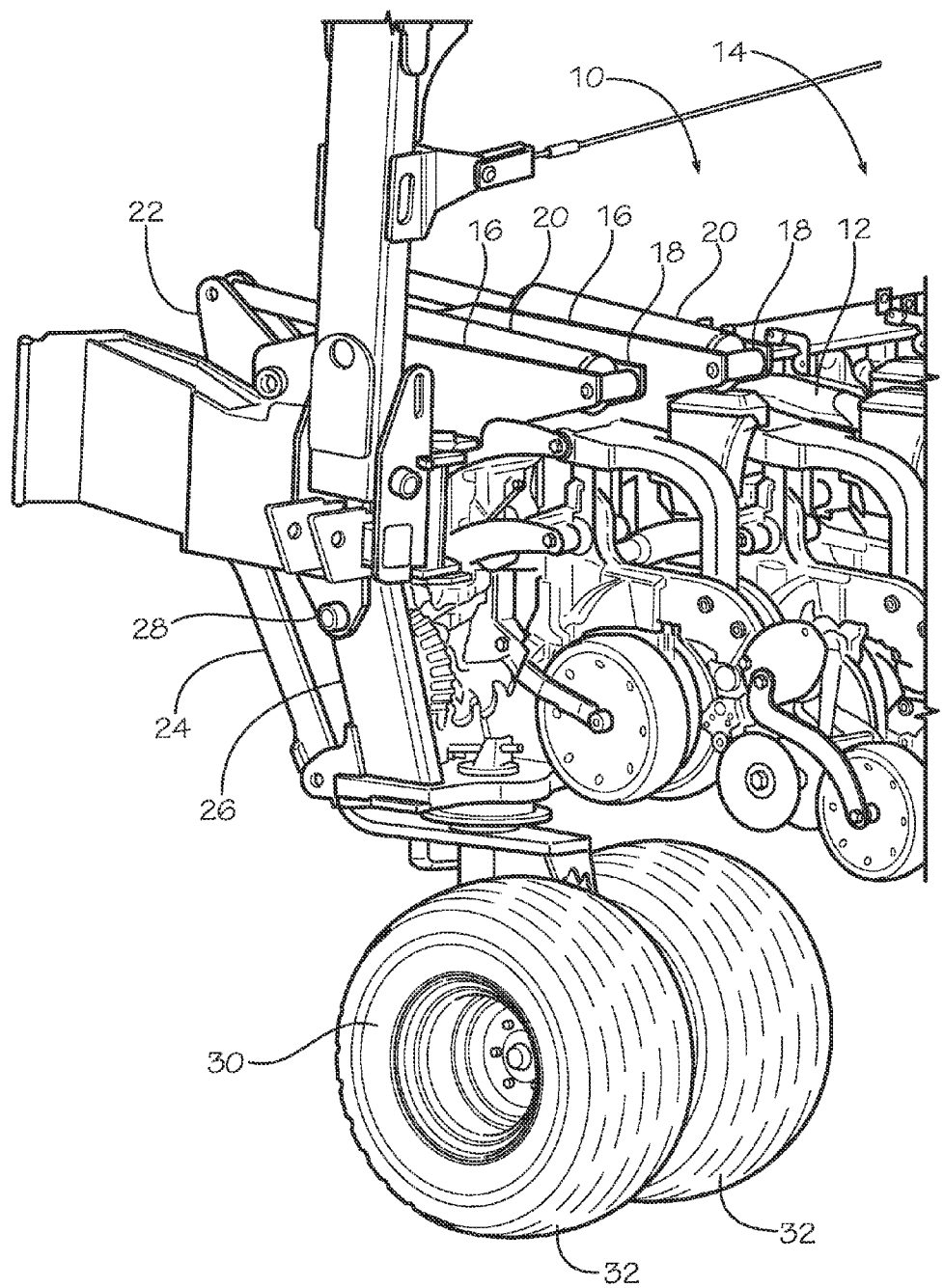
FIG. 2 is an isometric partial rear view of a wing section of an agricultural planter having a caster assembly that can be raised and lowered, in the lowered transport configuration.

Referring now to FIGS. 1 and 2, there is shown a wing section 14 of an agricultural planter 10 having a plurality of row units 12 arranged laterally along the length of its rearward side. The wing section 14 is provided with a caster assembly 30 that can be raised when in the working configuration and lowered when in the transport configuration. The caster assembly 30 in FIG. 1 is shown in the raised position in the working configuration. The caster assembly 30 in FIG. 2 is shown in the lowered position in the transport configuration. The caster assembly 30 is provided with a pair of wing section wheels 32, and is attached to a strut 26. The strut 26 pivots about a strut pivot point 28. A pair of wing section lift cylinders 20 are connected to the wing section 14 using rearward extending wing section lift cylinder mounting brackets 16 having rearward wing section lift cylinder mounting points 18. The wing section lift cylinders 20 act through a pair of bell cranks 22 connected to a pair of drop links 24, which are in turn connected to the strut 26. In the raised position as shown in FIG. 1, the caster assembly 30 engages a locating device 34, thereby preventing the caster assembly 30 from swiveling.

In order to lower the caster assembly 30 into the transport configuration, the wing section lift cylinders 20 extend, causing the bell cranks 22 to rotate clockwise as viewed in FIG. 1. Drop links 24 move down, causing strut 26 to pivot clockwise about strut pivot point 28 to a vertical position. In this way, the caster assembly 30 lifts the wing section 14 and row units 12 up and away from the ground for transport. Further, the caster assembly 30 disengages from the locating device 34, so that the caster assembly 30 may swivel freely. Each of the embodiments shown in FIGS. 1 and 2 are shown having two wing section lift cylinders 20, two bell cranks 22, and two drop links 24 leading to the single strut 26. However, it is contemplated that a single lift cylinder 20, bell crank 22, and drop link 24 may be used.

As a result, when the wing section 14 is extended outwardly and the caster assembly 30 is raised in the working configuration as shown in FIG. 1, the caster assembly 30 is in a position forward of the wing section 14 and does not function as a caster, remaining in a fixed position. When the wing section 14 is rotated forward parallel with the hitch bar of the center section (not shown) and the caster assembly 30 is lowered in the transport configuration as shown in FIG. 2, the caster assembly 30 is located beneath the wing section 14 and acts as a caster. In this way, the caster assemblies 30 of the wing sections 14 of the agricultural planter 10 continue to provide vertical support for the agricultural planter 10 when in the transport configuration and when transitioning to and from the transport configuration, while swiveling to allow transitioning to and from the transport configuration, and to allow the agricultural planter 10 to turn to follow the towing vehicle when in the transport configuration.

Note that the rearward extending wing section lift cylinder mounting brackets 16 and wing section lift cylinders 20 are located above and to the rearward of the wing section 14, so that the space directly to the rearward of wing section 14 remains clear for the free placement and spacing of row units 12. Further, when bell cranks 22 are rotated downward, the lower legs of bell cranks 22 and the drop links 24 lie generally flush against the front of wing section 14, so that no interference results with the center section (not shown) of the agricultural planter 10 when the wing section 14 is folded forward and close to the center section.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural planter having at least one wing section, said at least one wing section being operable to rotate forward about a vertical hinge to a transport configuration and to rotate outward about said vertical hinge to a working configuration, comprising:
   a caster assembly attached to a strut, said strut pivotable between a raised position forward of said at least one wing section and a lowered position beneath said at least one wing section about a strut pivot point attached to said at least one wing section;
   at least one wing section lift cylinder located above and horizontally rearward of said at least one wing section, said at least one wing section lift cylinder being connected to said at least one wing section using a rearward extending wing section lift cylinder mounting bracket; and
   at least one bell crank and at least one drop link, said at least one wing section lift cylinder further connected to said at least one bell crank, said at least one bell crank being further connected to said at least one drop link, and said at least one drop link being further connected to said strut,
   wherein said at least one bell crank and said at least one drop link lying flat against the front of said at least one wing section when said at least one wing section lift cylinder is extended and said caster assembly attached to said strut is in its lowered position.

2. The agricultural planter of claim 1, wherein:
   said at least one wing section lift cylinder being operable to move said caster assembly attached to said strut to the lowered position by extending and causing said at least one bell crank to rotate forward and downward, said at least one bell crank rotating forward and downward causing said at least one drop link to move downward, said at least one drop link moving downward causing said strut to rotate downward; and
   said at least one wing section lift cylinder being operable to move said caster assembly attached to said strut to the raised position by contracting and causing said at least one bell crank to rotate rearward and upward, said at least one bell crank rotating rearward and upward causing said at least one drop link to move upward, said at least one drop link moving upward causing said strut to rotate upward.

3. The agricultural planter of claim 1, wherein:
   said at least one wing section lift cylinder being two wing section lift cylinders, said at least one bell crank being two bell cranks, and said at least one drop link being two drop links.

4. The agricultural planter of claim 1, wherein:
   said caster assembly attached to said strut having a locating device portion operable to engage another locating device portion attached to said at least one wing section upon movement of said strut to said raised position, the engagement of said locating device portions preventing said caster assembly from swiveling in said raised position.

5. The agricultural planter of claim 1, wherein:
   said caster assembly attached to said strut being operable to pivot to a transverse orientation to said at least one wing section in order to allow said at least one wing section to rotate forward about said vertical hinge to said transport configuration, and to pivot to a parallel orientation to said at least one wing section in order to allow said agricultural planter to be pulled behind an agricultural tractor when in said transport configuration.

6. The agricultural planter of claim 5, wherein:
   said caster assembly being operable to provide support to said at least one wing section in said working configuration, in said transport configuration, and during a transition from said working configuration to said transport configuration or from said transport configuration to said working configuration.

7. A support arrangement for a wing section of an agricultural planter, said wing section being operable to rotate forward about a vertical hinge to a transport configuration and to rotate outward about said vertical hinge to a working configuration, comprising:
   a caster assembly attached to a strut, said strut pivotable between a raised position forward of said wing section and a lowered position beneath said wing section about a strut pivot point attached to said wing section;
   at least one wing section lift cylinder located above and horizontally rearward of said wing section, said at least one wing section lift cylinder being connected to said wing section using a rearward extending wing section lift cylinder mounting bracket; and
   at least one bell crank and at least one drop link, said at least one wing section lift cylinder further connected to said at least one bell crank, said at least one bell crank being further connected to said at least one drop link, and said at least one drop link being further connected to said strut,
   wherein said at least one wing section lift cylinder being operable to move said caster assembly attached to said strut to the lowered position by extending and causing said at least one bell crank to rotate forward and downward, said at least one bell crank rotating forward and downward causing said at least one drop link to move downward, said at least one drop link moving downward causing said strut to rotate downward; and
   said at least one wing section lift cylinder being operable to move said caster assembly attached to said strut to the raised position by contracting and causing said at least one bell crank to rotate rearward and upward, said at least one bell crank rotating rearward and upward causing said at least one drop link to move upward, said at least one drop link moving upward causing said strut to rotate upward.

8. The support arrangement for a wing section of an agricultural planter of claim 7, wherein:
   said at least one wing section lift cylinder being two wing section lift cylinders, said at least one bell crank being two bell cranks, and said at least one drop link being two drop links.

9. The support arrangement for a wing section of an agricultural planter of claim 7, wherein:
   said caster assembly attached to said strut having a locating device portion operable to engage another locating device portion attached to said wing section upon movement of said strut to said raised position, the engagement of said locating device portions preventing said caster assembly from swiveling in said raised position.

10. The support arrangement for a wing section of an agricultural planter of claim 7, wherein:
    said at least one bell crank and said at least one drop link lying flat against the front of said wing section when said at least one wing section lift cylinder is extended and said caster assembly attached to said strut is in its lowered position.

11. The support arrangement for a wing section of an agricultural planter of claim 7, wherein:
said caster assembly attached to said strut being operable to pivot to a transverse orientation to said wing section in order to allow said wing section to rotate forward about said vertical hinge to said transport configuration, and to pivot to a parallel orientation to said wing section in order to allow said agricultural planter to be pulled behind an agricultural tractor when in said transport configuration.

12. The agricultural planter of claim 11, wherein:
said caster assembly being operable to provide support to said wing section in said working configuration, in said transport configuration, and during a transition from said working configuration to said transport configuration or from said transport configuration to said working configuration.

13. A method of providing an agricultural planter reconfigurable between a working configuration and a transport configuration, the method comprising the steps of:
providing at least one wing section being operable to rotate forward about a vertical hinge to said transport configuration and to rotate outward about said vertical hinge to said working configuration;
providing a caster assembly attached to a strut, said strut pivotable about a strut pivot point attached to said at least one wing section between a raised position forward of said at least one wing section when in said working configuration and a lowered position beneath said at least one wing section when in said transport configuration;
providing at least one wing section lift cylinder located above and horizontally rearward of said at least one wing section, said at least one wing section lift cylinder being connected to said at least one wing section using a rearward extending wing section lift cylinder mounting bracket; and
providing at least one bell crank and at least one drop link, said at least one wing section lift cylinder further connected to said at least one bell crank, said at least one bell crank being further connected to said at least one drop link, and said at least one drop link being further connected to said strut, said at least one bell crank and said at least one drop link lying flat against the front of said at least one wing section when said at least one wing section lift cylinder is extended and said caster assembly to said strut is in its lowered position,
using said at least one wing section lift cylinder to move said caster assembly attached to said strut to the lowered position by extending and causing at least one bell crank to rotate forward and downward, said at least one bell crank rotating forward and downward causing said at least one drop link to move downward, said at least one drop link moving downward causing said strut to rotate downward; and
using said at least one wing section lift cylinder to move said caster assembly attached to said strut to the raised position by contracting and causing said at least one bell crank to rotate rearward and upward, said at least one bell crank rotating rearward and upward causing said at least one drop link to move upward, said at least one drop link moving upward causing said strut to rotate upward.

14. The method of claim 13, wherein:
said at least one wing section lift cylinder being two wing section lift cylinders, said at least one bell crank being two bell cranks, and said at least one drop link being two drop links.

15. The method of claim 13, wherein:
said caster assembly attached to said strut having a locating device portion operable to engage another locating device portion attached to said at least one wing section upon movement of said strut to said raised position, the engagement of said locating device portions preventing said caster assembly from swiveling in said raised position.

16. The method of claim 13, wherein:
said at least one bell crank and said at least one drop link lying flat against the front of said at least one wing section when said at least one wing section lift cylinder is extended and said caster assembly attached to said strut is in its lowered position.

17. The method of claim 13, wherein:
said caster assembly attached to said strut being operable to pivot to a transverse orientation to said at least one wing section in order to allow said at least one wing section to rotate forward about said vertical hinge to said transport configuration, and to pivot to a parallel orientation to said at least one wing section in order to allow said agricultural planter to be pulled behind an agricultural tractor when in said transport configuration; and
said caster assembly being operable to provide support to said at least one wing section in said working configuration, in said transport configuration, and during a transition from said working configuration to said transport configuration or from said transport configuration to said working configuration.

* * * * *